Nov. 4, 1924.
J. C. COLEMAN
1,513,893
FISHING REEL
Filed April 15, 1922
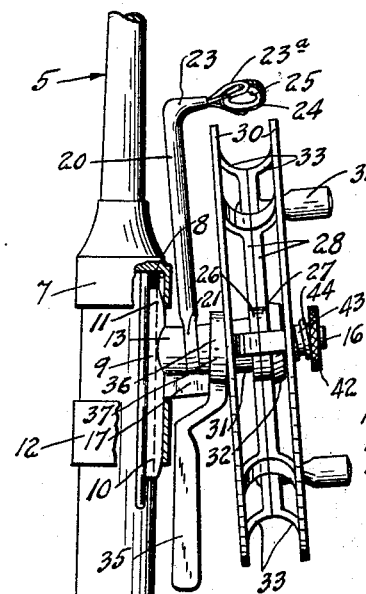
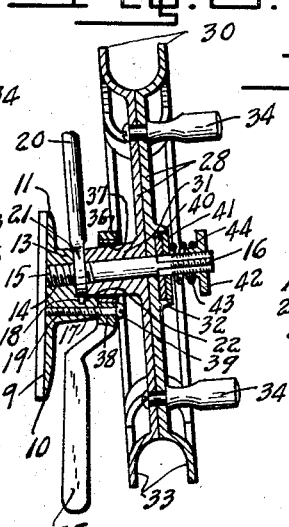
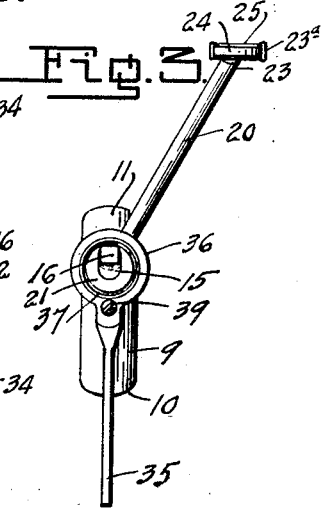
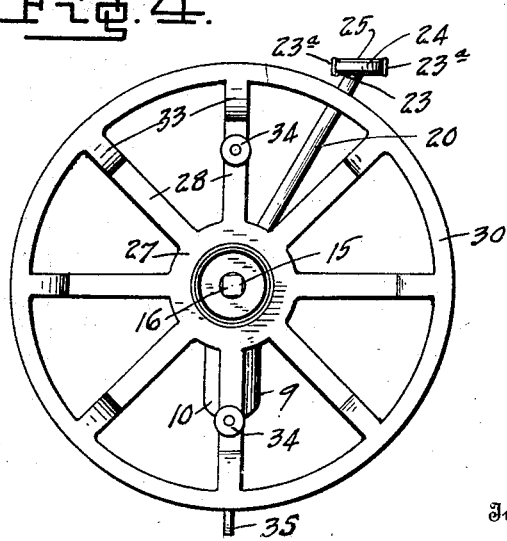
Inventor
Joseph C. Coleman
By Watson E. Coleman
Attorney Patented Nov. 4, 1924.

1,513,893

UNITED STATES PATENT OFFICE.

JOSEPH C. COLEMAN, OF KOKOMO, INDIANA.

FISHING REEL.

Application filed April 15, 1922. Serial No. 552,919.

*To all whom it may concern:*

Be it known that I, JOSEPH C. COLEMAN, a citizen of the United States, residing at Kokomo, in the county of Howard and State of Indiana, have invented certain new and useful Improvements in Fishing Reels, of which the following is a specification, reference being had to the accompanying drawings.

This invention relates to fishing reels, and has for its object to provide a fishing reel capable of being applied to any fishing pole, and provided with means for controlling the rotation of the reel.

It is also an object of the invention to provide a reel of this character having a brake for retarding the rotary movement of the reel, said brake being disposed remote from the handles of the reel.

Another object of the invention is to provide a reel of this character wherein a novel line guide is carried by the support of the reel and extended to the periphery thereof, said guide preventing back-lash of the line and causing the line to be properly positioned within the channel of the reel.

A further object of the invention is to provide a reel of this character wherein a brake is disposed in engagement with the hub of the reel, and adjustable and yieldable means for securing the reel to its shaft, said means being also operable to retard the rotary movement of the reel.

A still further object of the invention is to provide a relatively large and light reel the reel being formed from two pieces of material.

With these and other objects in view, the invention consists in the improved construction and arrangement of parts to be hereinafter more particularly described, fully claimed and illustrated in the accompanying drawings, in which:—

Figure 1 is a fragmentary elevation of a fishing pole with the invention applied;

Figure 2 is a longitudinal sectional view of the structure shown in Figure 1;

Figure 3 is a front elevation of the bracket with the reel, and fastening means of the reel removed; and Figure 4 is a side elevation showing the relative position of the line guide and formation of the reel.

Referring to the drawings, 5 designates a conventional form of fishing pole including the usual handle 6 and pole ferrule 7, the ferrule 7 having an enlargement 8 adapted to cooperate with the pole 5 to provide a socket, the purpose of which will be hereinafter described.

A reel bracket 9 is provided, said bracket consisting of a body member having its rear face transversely curved to conform to the curvature of the pole, and its ends 10 and 11 tapered outwardly, the end 11 being adapted to extend into the socket 8, while a band or ring 12 is adapted to embrace the end 10, said ring being forced toward the end 11 so as to firmly bind the body member 9 to the pole. The body member includes an extension 13, the outer face of the extension being canted toward the end 11 of the bracket, said extension having a threaded bore 14, extending obliquely of the extension, in which a shaft 15 is threaded, the outer end 16 of the shaft being also threaded. Projecting beneath the extension 13 and beyond said extension is a lug 17 having a recess 18 in one face thereof, and a threaded bore 19 extending through the end of the lug below the recess 18. The structure above described is intended to support all parts of the reel so as to render the reel not only efficient, but simple in construction.

In connection with the device, a novel line guide is provided, said guide consisting of an arm 20 having its end 21 enlarged and provided with a threaded opening adapted to receive the inner threaded end of the shaft 15, whereby the enlarged end is held in engagement with the outer canted face of the extension 13. The enlarged end 21 is also provided with a lug 22 adapted to enter the recess 18 of the lug 17 to prevent movement of the guide relative to the body member. The length of the arm 20 corresponds substantially to half of the diameter of the reel, the end portion 23 of the arm being provided with a recess adapted to receive supporting fingers 23ᵃ, said fingers being formed from wire and extended in divergent relation to each other from the arm. A metallic ring 24 is secured to the fingers 23, while disposed within the ring 24 is a composition ring 25, said composition ring preventing wear of the fishing line, and being of a size to permit unobstructed movement of the line therethrough. In view of the canted face of the extension and the obliquely extending bore 14, the guide is disposed in alignment with the guide on the end of the pole.

The reel proper comprises a pair of discs 26 and 27, said discs being made preferably of light metal. Each disc is stamped to provide a plurality of spokes 28 which radiate from a hub member, the spokes being connected at their outer ends to a rim 30, the hub member 31 of the disc 26 being smaller in diameter and greater in length than the hub member 32 of the disc 27. The hub member 32 is practically a flange having a recess in its central portion. In the formation of the reel, the spokes of each disc, and the inner face of the hub member of each disc, are disposed in engagement with each other, and secured by any suitable means such as brazing, etc.

Before the spokes are secured to each other, the outer end portions 33 of the spokes are substantially offset with respect to the projecting hub portions of the discs, consequently disposing the rims 30 above or beyond the hub members of the discs. When the discs are engaged with each other for the purpose of forming the reel, the offset portions are arranged so that the rims 30 are positioned in spaced relation to each other and the offset portions made to align, so that a substantially U-shaped channel is provided, through the cooperation of the offset portions 33 and the spaced rims, said channel being adapted to receive the fishing line. Certain of the spokes are provided with rotatable handle members 34, so that a handle member is always within reach when necessary.

The reel is adapted to engage the shaft 15 in such a way that the end face of the hub member 31 engages the outer face of the enlargement 21 of the line guide 20, so as to space the reel from the line guide and at the same time position the ring portions 24 and 25 over the channel of the reel and closely adjacent the rims 30 of the reel.

In order to retard or brake the reel in its rotary movement, a novel brake 35 is provided, said brake consisting of a length of material having its end portion 36 offset with respect to the body member or handle of the brake, the end portion 36 being enlarged and adapted to receive the hub portion 31 of the reel, the diameter of which being greater than the diameter of the hub portion 31. The wall of the opening has applied thereto a brake band 37. The end portion 36 of the brake adjacent the opening is provided with a threaded opening 38 adapted to receive a screw 39 which is intended to extend into the threaded bore 19 of the lug 17, the screw 39 being slightly longer than the bore 38 so as to permit the brake to rock upon the screw and cause the brake band 37 to bind upon the extension 31.

The recess provided in the hub portion 32 of the reel is adapted to receive a fabric washer 40 and a metallic washer 41, the metallic washer having a square central opening adapted to engage a small squared portion of the shaft 15 to prevent rotation of the washer. A knurled thumb nut 42 is provided, said thumb nut having a threaded extension 43 projecting from one face thereof and adapted to engage the outer threaded end 16 of the shaft 15. An expansion spring 44 is secured to the extension 42 and is adapted to engage the washer 41. By this means upon rotation of the nut 42, the washer 41 is urged into frictional engagement with the reel, so as to resist to a certain degree rotation of the reel, and at the same time to hold the reel on the shaft and in engagement with the face of the enlargement 21 of the line guide.

In view of the canted face of the extension 13, the reel is inclined toward the pole so as to prevent an angle in the line when the same is being wound upon the reel, as this particular position permits the guide arm 20 which is also inclined with the reel to align with the end of the pole, so that the line passes through the ring 25 and the guide on the end of the pole unobstructed. When the operator desires to cast the line the same may be projected in the usual manner, causing unwinding of the reel. In case the reel should revolve faster than desired, in order to prevent backlash, it is only necessary for the operator to press upon the handle 35 so as to move the handle laterally of the extension. Only a slight pressure on the brake 35 is necessary in order to stop the reel, as the brake oscillates laterally of the extension providing a relatively wide surface for frictional engagement with the hub of the reel. At the same time, by inclining the reel toward the pole, considerable space is provided adjacent the handle of the reel, so that there is no danger of interference with the brake when the fisherman desires to use the same.

From the foregoing it will be readily seen that this invention provides a novel form of reel capable of being made from light material, such as aluminum, and wherein the line may be drawn in rapidly without any great increase in rotation of the reel, in view of the diameter of the reel. An important feature of the device is that the rotation of the reel may be instantly retarded or stopped by the novel brake 35, by simply pressing the thumb of the hand holding the rod against the handle of the brake. If it is desired, previously to casting the line, or after the line has been cast, the nut 42 may be rotated so as to increase the extent of rotation, and in addition to this, the brake may also be used, as the adjustment of the nut does not interfere with the operation of the brake 35. Another feature is that in view of the spokes and the open channel of the reel, it is possible for the air to reach all portions of the wet fishing line to dry the same, and all of these features are possessed by a simple form of reel that can be readily applied to any conventional form of fishing pole.

What is claimed is:—

1. A fishing reel comprising a support, a bracket connected to the support, said bracket having an extension, a line guide engaged with the extension, a shaft threaded into the bracket, and the line guide, for connecting the line guide to the bracket, a brake member including a brake band connected to the extension adjacent the line guide, a reel mounted on the shaft, said reel having a hub member extending through the band into engagement with the line guide, and adjustable and yieldable holding means carried by the end of the shaft.

2. A fishing reel comprising a pair of discs, each constructed to provide a hub member, radiating spokes, and an outer rim, the spokes of each disc adjacent the rim being substantially offset to position the rim in a plane parallel to the plane of the hub member, the hub member and spokes of each disc being secured to each other with their offset portions extending outwardly, said offset portions being disposed substantially in alignment and coacting with the rims of the discs to provide a channel in the periphery of the reel.

3. A fishing reel comprising a support, a bracket carried by the support, said bracket having an extension on one face thereof, the end face of the extension being canted toward one end of the bracket, said extension having a threaded bore extending obliquely of the extension and through the canted face thereof, a line guide arm engaged with the canted face of said extension, a shaft threaded through said arm and into the bore of the extension, a reel mounted on the shaft, the hub of said reel being adapted to engage the end portion of the arm, said arm being disposed in an inclined position relative to the bracket, and adjustable means carried by the outer end of the shaft for preventing disengagement of the reel from the shaft.

In testimony whereof I hereunto affix my signature.

JOSEPH C. COLEMAN.